Oct. 20, 1970     H. DAUM ET AL     3,535,418

METHOD FOR MANUFACTURING FOOTWEAR

Filed May 1, 1967     6 Sheets-Sheet 1

Inventors
Helmut Daum
Oskar Schmoll by Michael S. Striker

Oct. 20, 1970    H. DAUM ET AL    3,535,418
METHOD FOR MANUFACTURING FOOTWEAR
Filed May 1, 1967    6 Sheets-Sheet 2

United States Patent Office 3,535,418
Patented Oct. 20, 1970

3,535,418
METHOD FOR MANUFACTURING FOOTWEAR
Helmut Daum, Eberbach, Germany, and Oskar Schmidt, Weyrgasse 6, Vienna 3, Austria; said Daum assignor to said Schmidt
Filed May 1, 1967, Ser. No. 636,242
Claims priority, application Austria, May 3, 1966, A 4,181/66
Int. Cl. A43d 65/02; B29h 7/08; B29c 17/06
U.S. Cl. 264—244         1 Claim

ABSTRACT OF THE DISCLOSURE

A method of making footwear in which the main portion of a shoe-upper blank is placed in a mold cavity with a marginal portion of the blank projecting beyond the open side of the cavity and in which the main portion is deformed into conformity with the shape of the cavity, whereafter the sole is molded to the marginal portion of the blank.

---

This invention relates to a method of manufacturing footwear particularly shoes which avoids the use of lasts such as are used in conventional manufacturing techniques.

The method of the present invention comprises the steps of arranging an upper on an expansible former, positioning the former in a hollow mould having the desired shape of the upper, locating the marginal edge of the upper in relation to the mouth of the mould such that a portion thereof protrudes from the mould, and forming the upper to the shape of the mould by expanding the former.

Conveniently the former is an elastic bag which may be expanded to fill the mould by the introduction of fluid (medium) under pressure.

In a preferred arrangement the mould is closed by a plate which fits in the mouth of the mould and grips at least in part the marginal edge of the upper.

After forming the upper a sole may be secured to the protruding edge of the upper. Conveniently this may be achieved by securing a sole mould over the hollow mould and introducing, as by injection, a suitable sole forming material which, when it has set, adheres or bonds to the protruding edge of the upper.

Apparatus for carrying out the method of this invention may comprise a hollow mould and a former movable relative to the mould and comprising a plate fitting the mouth of the mould and an expansible bag. The apparatus may also comprise a sole mould and means for securing it over the mouth of the hollow mould.

The method of this invention may be used in the manufacture of different types of footwear and substantially the same apparatus may be used in each case. This is exemplified in the following description of the accompanying drawings in which the manufacture of three different kinds of shoes is described by way of example.

EXAMPLE 1

Figure 1:
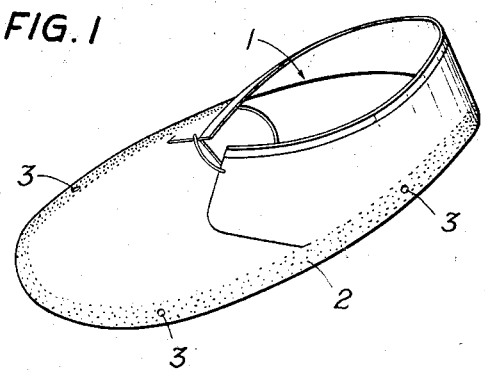
FIG. 1 shows a view of a closed upper as used in Example 1.

A closed upper 1 (FIG. 1), which for example may be made of smooth artificial leather and may have toe and heel stiffeners, is formed with a feather edge or sole attachment margin 2 which for example is 6 mm. wide and which is roughened.

Figure 2:
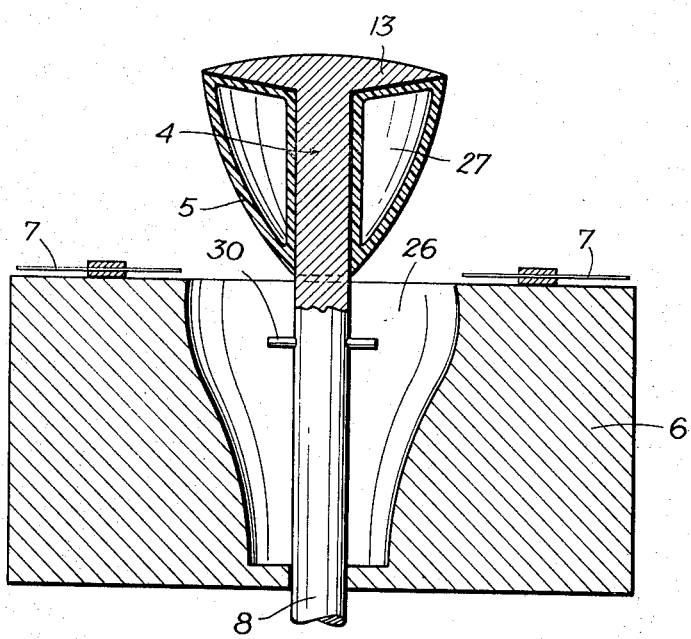
FIG. 2 is a diagrammatic transverse cross-section in the heel zone of the former and hollow mould, the former being shown in the open position.

This upper, after softening if necessary by the action of heat or moisture, is arranged on a former 4 (FIG. 2) which is mounted on a stem 8 so that it can be drawn down into the cavity 26 of a hollow mould 6. The former comprises a plate 13 which closely fits the mouth of the cavity 26 and an elastic bag 5 which may be expanded to fill the cavity 26 by the introduction of pressure fluid (medium) conveniently supplied through the stem 8.

The hollow mould 6 is shaped to the required form of the upper and its top surface and also that of the plate 13 is contoured so that the adjacent edges of the plate and the mouth of the mould follow the insole line of the shoe to be made.

Figure 3:
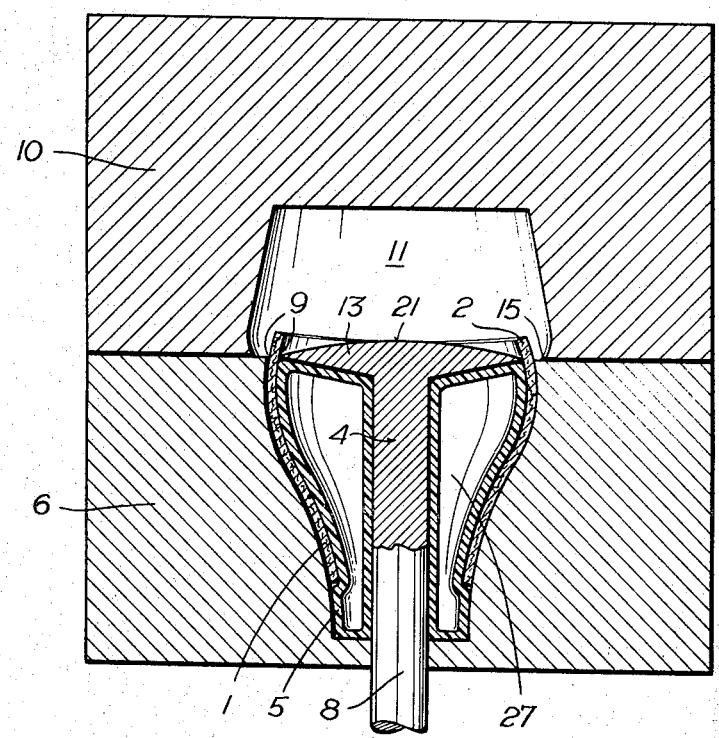
FIG. 3 is a diagrammatic transverse cross-section similar to FIG. 2 but with the former shown in the closed position, the upper already formed to shape and a sole mould applied in the preparation for the formation of soles.

After the upper has been positioned on the former 4 this former is moved downwards into the mould and until the edge of the plate 13 grips the margins of the upper only at the junction of the marginal portion 2 and the main portion against the edge of the mould cavity, for example in the region 9 (FIG. 3). It will be appreciated that the upper is pulled over the former 4 until a predetermined line is precisely located with respect to the edge of plate 13, for example the line defined by the joint of margin 2 with the upper 1 should coincide with the edge of plate 13. To ensure that no change in position occurs during the subsequent operation, the margin 2 may also be located by means of movable needles 7 (FIG. 2) engaging in holes 3 formed in the margin.

With the former 4 now closed on mould 6, pressure fluid, for example hot oil, is supplied to the bag 5 which expands to fill the cavity 26 in the mould and in so doing stretches the upper and forces it against the wall of cavity 26 whereby it is formed to the desired shape.

Figure 4:
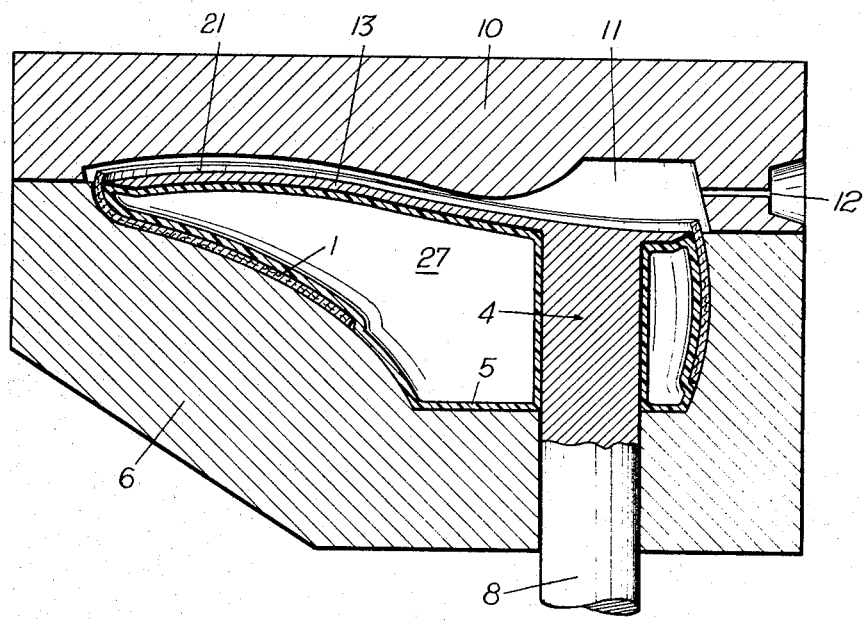
FIG. 4 is a diagrammatic longitudinal section of the arrangement of FIG. 3.

After this forming operation the needles 7 are removed and a sole mould 10 (FIGS. 3 and 4) is applied on to the hollow mould 6, the two moulds being shaped so that they seal one on the other.

The arrangement is now as shown in FIG. 3 and it will be seen that the margin 2 of the upper 1 protrudes into the cavity 11 of the sole mould 10.

A suitable sole forming material, such as PVC, is now injected into the cavity 11 through orifice 12, and after the material has set the sole mould 10 is withdrawn. The pressure fluid in the bag 5 is now withdrawn, the former 4 is raised to the position shown in FIG. 2, and the completed shoe removed therefrom.

It will be appreciated that the movement of the former 4 and the sole mould 10 may be achieved by any suitable mechanical, pneumatic or hydraulic means.

EXAMPLE 2

Figure 6:
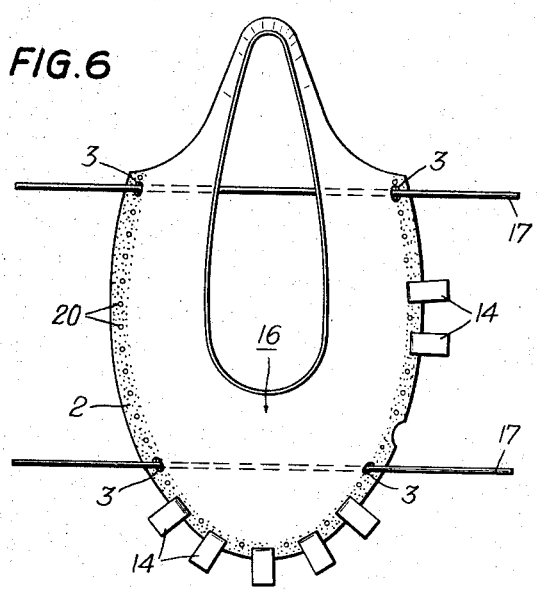
FIG. 6 shows a plan view of an upper for the sling back shoe of Example 2.

An upper 16 (FIG. 6) for a sling back type shoe having an inserted toe cap of smooth leather and a sole attachment margin 2 of a uniform width of, say 5 mm., which margin is roughened or provided with a chemical adhesive, is brought to a relative humidity of 80% by the action of steam. Within and around the sole attachment margin 2 are arranged sole-fastening holes 20 having a diameter of about 2 mm. and four fixing holes 3, located at the toe cap end and the rear end of the upper. Long fixing needles 17, resembling knitting needles, and 2 mm. in diameter, are inserted through the fixing holes 3, so as to extend from one side of the body to the other, the arrangement being such that when the upper 16 is drawn on to the former 4 the plate 13 is positioned between the needles 17 and the upper 16.

Figure 7:
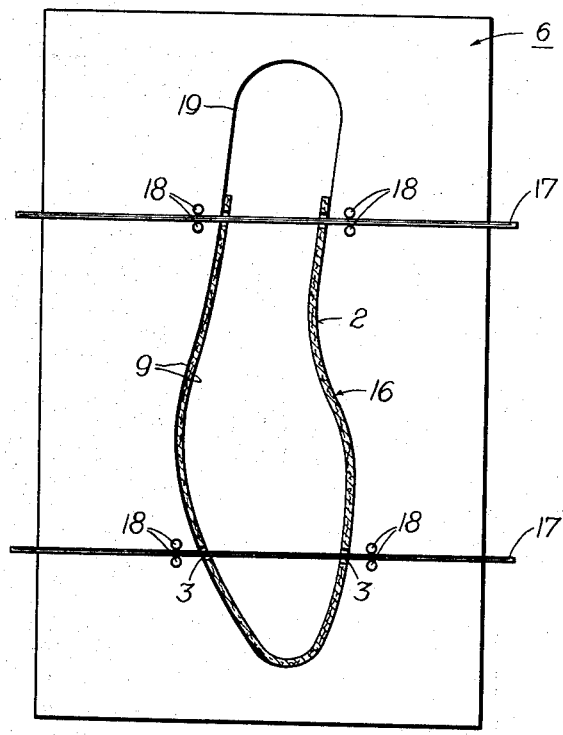
FIG. 7 is a plan view of the arrangement of FIG. 5.

The former 4, together with the upper thereon, is moved downwards into the cavity 26 of the hollow mould 6 as previously described, and the fixing needles 17 are now inserted between the stop pins 18 (FIG. 7).

The closure plate 13 grips the margin 2 of the upper against the edge of the mould cavity, e.g. in the region 9, but at the heel end any space between the plate and the mould cavity is sealed by the elastic bag 5.

Figure 5:
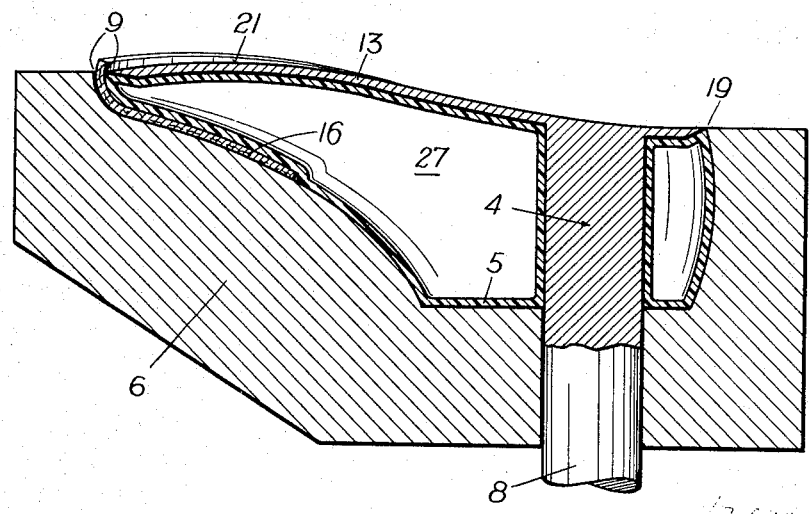
FIG. 5 is a section similar to FIG. 4 but omitting the sole mould illustrating how the same apparatus may be used to produce a sling back type of shoe (Example 2)

To prevent protrusion of the bag in the region 19 (FIGS. 5 and 7) the adjacent edge of the bag may be suitably reinforced.

The bag is now expanded, as by the introduction of hot steam under pressure, and the upper thereby formed to the shape of the mould 6. As an additional precaution to prevent the margin 2 of the upper being pulled into the mould during the forming operation, clips 14 (FIG. 6) may be attached to the margin.

After forming, the top clips 14 and fixing needles 17 are removed by hand or mechanically, and the sole mould 10 is pressed on to the mould 6. By means of injection apparatus the sole material, for example a polyurethane elastomer, is injected in the form of an appropriate mixture of its basic materials through the injection orifice 12 (FIG. 4) into the cavity 11 of mould 10. The mass forming the sole thereby fills the cavity 11 and flows around the sole attachment margin 2 and through the sole-fastening holes 20, whereby a particularly good attachment of the sole to the upper 16 is achieved. The mould 6 may be formed from a porous material through which steam can pass, and it may have a temperature of about 70° C. (Because of the thermal effects of the mould 6 and the bag 5, filled with a hot pressure medium, upon the shaped upper 16 the humidity of the material is reduced within a few minutes to a normal humidity content.) The thermal effect on both sides of the upper 16 is equivalent to an ironing action which imparts a very good shape stability to the finished shoe. The steam generated during the drying process escapes outwards through the steam-permeable mould 6. After about ten minutes the mould is opened, i.e. the sole mould 10 is raised and releases the sole. The pressure in the bag 5 is reduced and its volume thereby considerably diminished; if necessary, it can be still further reduced by application of a vacuum. The former 4 is now raised and thereby removes the finished shoe from the mould 6. The shoe can now be removed from the former 4.

EXAMPLE 3

Figure 8:
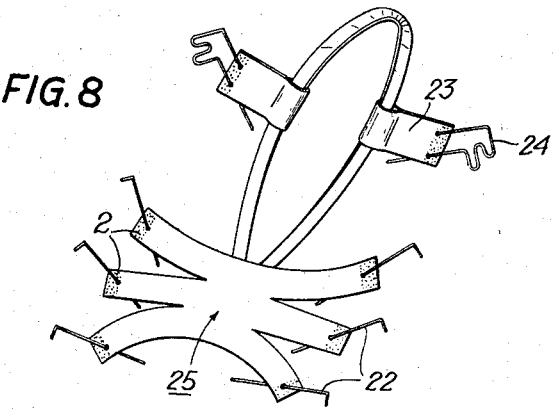
FIG. 8 shows a view of a strapped sandal upper (Example 3)
Figure 9:
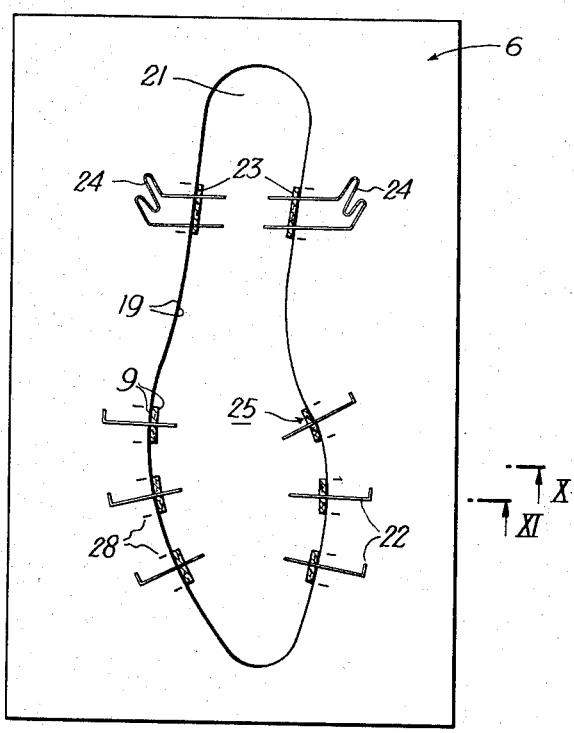
FIG. 9 is a plan view, corresponding to FIG. 7, illustrating the manufacture of the sandal (Example 3)
Figure 10:
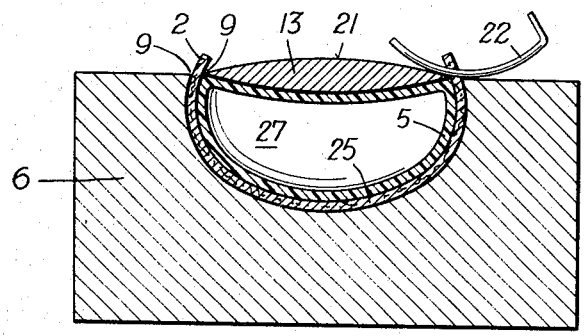
FIGS. 10 and 11 are respectively cross-sections on the lines X—X and XI—XI of FIG. 9, FIG. 11 however showing a sole mould in position.
Figure 11:
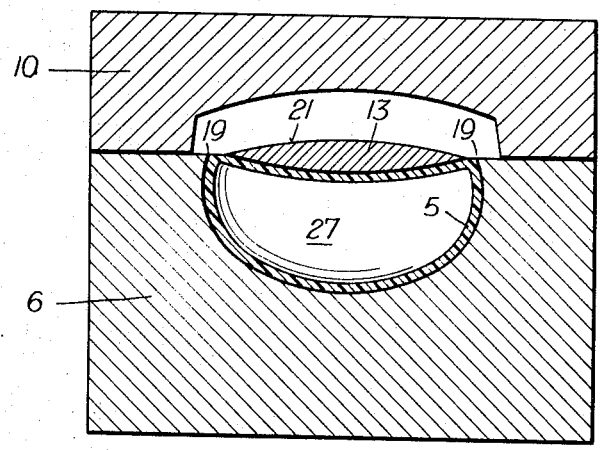

A 6 mm. wide sole attachment margin 2 of a leather strap sandal upper 25 (FIG. 8) is roughened and provided with fixing holes 7. Hook-shaped fixing needles 22, of semicircular cross-section, are inserted in the fixing holes, and a hook-shaped fixing clip 24 which is formed for two fixing holes, is inserted into each of the heel webs 23 which are fairly wide. The upper 25 is forced over the former 4 and its deflated bag 5 which is then drawn down into the cavity 26 of mould 6 which is formed to correspond to the desired shape of a finished closed shoe. Before plate 13 seals the mould cavity the fixing needles 22 and the fixing clips 24 are laid over the closure plate 13 in such a way that the ends of the straps coincide with markings 28 on the mould 6. The former 4 is now moved downwards into the cavity 26 to a position determined by a stop 30 located on the stem 8. The bag is now inflated by means of steam at about 10 atmospheres and thereby achieves the shaping of the strap sandal upper 25 and the sealing of the cavity 11 in mould 10 intended for forming the sole in the next operation. In this example two kinds of sealing are used. Sealing at region 9 is achieved by clamping between the mould 6 and the plate 13 the thickness of the upper in the zone of the sole attachment margin 2. On the other hand, sealing at region 19 is effected by the bag 5 applied below and against the plate 13 and the side of mould 6 in such manner as to seal the gap therebetween when the volume of the bag increases. In the region of the sole and particularly at the sealing region 19, the bag 5 can have horizontally disposed reinforcements, e.g. in the form of rods of metal or solid plastic, which enable the bag 5 to expand at the sealing region 19 only in a roughly horizontal direction whereby expansion of the bag 5 into the cavity 11 during the increase in volume is prevented.

After the upper 25 has been shaped, the hook-shaped fixing needles 22 and fixing clips 24 are withdrawn from the sole-attachment margin 2 and this can be readily done by hand or mechanically because of the hook-shaped arrangement. A sole mould 10 (FIG. 1) is now applied to the hollow mould 6, the bag 5 being maintained in its expanded condition. By means of a rubber-injection machine, a rubber mixture with a rising additive is injected into cavity 11. The rubber mixture begins to rise, fills the cavity to form the sole, which bonds itself on to the sole-attachment margin 2 and flows through the fixing holes 7 located at each strap end, whereby an additional anchoring of the straps to the sole is achieved. The temperature of the mould 10 is about 150° C., that of the closure plate 13, the bag 5 and the mould 6 each being about 70° C. After about five minutes the mould 10 is raised and frees the sole. The bag is reduced in size by about 50% by an appropriate reduction in pressure, and finally the former 4 is raised thereby to remove the finished sandal from the mould 6. The finished strap sandal can now be removed from the former 4.

Figure 12:
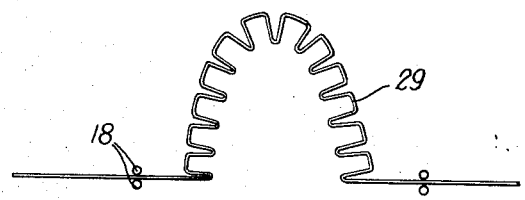
FIG. 12 shows a particularly advantageous form of a clip which is intended for locating the marginal edge of an upper in the region of the toe cap.

As can be seen from the three examples of the method according to this invention, by the use of an appropriately shaped bag and with one and the same set of moulds, closed shoes as well as shoes which have more or less large recesses in the region where the sole is attached to the upper, e.g. strap sandals and sling back shoes and the like, can be produced, the attachment of a sole being preferably carried out by an injection process or a similar method of making the sole. Stop-clips, stop-clamps, needles, pegs, clasps, stitched-on straps or profiles etc. can be used in a great number of variants and forms in order to locate the upper in the correct position and to act as stops during the process of shaping the upper so that the sole attachment margin projects a prescribed distance beyond the edge of the mould 6. A particularly advantageous embodiment of a combined stop and fixing means is illustrated in FIG. 12. This clip 29 is fitted to a loose upper by insertion in, for example, thirteen sole-fastening holes in the toe portion of an upper. The long ends of the clip 29 serve for fixing the upper and are inserted between the stop pins 18 upon closure of the former into the mould 6. As can be seen from FIG. 12, the clip 29 corresponds in shape to the contour of the toe of the sole. Upon fitting of the clip to the loose upper by insertion into the sole-fastening holes, the upper is drawn over the former 4 and lowered into and held in the mould 6.

The uppers can of course be shaped in the region of the toe, the heel and the instep before they are fitted over the former 4. In the method according to the invention, the uppers can be made of any desired material, such as all kinds of upper leather, PVC, the large variety of artificial leathers, rubber or knitted or woven or unwoven materials coated with plastic, etc.

For manufacturing the sole of the shoe, a wide variety of sole-forming materials can be injected, vulcanised, or applied by chemical reaction, e.g. polyurethane elastomers, also in the form of mixtures of their basic components, e.g. mixtures of di- or polyisocyanates with di- or polyhydroxyl compounds and appropriate additives or cross-linking agents, mixtures of natural and synthetic rubber, plastic pastes, especially PVC, granulates, plastisols, polyalkylene plastics or mixtures (e.g. polybutadiene) etc. For the purpose of reducing cost and improving quality, it is of course possible to use as additives a wide variety of fibrous materials, such as glass wool and slag wool, and various flock materials such as cotton, cellulose, nylon etc. flock; furthermore, additions of ZnO and/or MgO can be used. Colouring is possible with the help of suitable organic and inorganic colouring materials such as, for example, organic pigments, $TiO_2$, iron oxide colouring agents, lithopone, etc. For softening, aromatic and aliphatic softening agents, unsaturated and saturated fatty acids, zinc or barium stearate, lanolin, coconut oil, etc. can be considered.

Instead of forming the soles directly on to the sole attachment margin and bonding them thereto at the same time, it lies within the ambit of the invention that the uppers, formed with the help of the former 4 and mould 6, may be attached on to preformed soles, e.g. by bonding. If necessary, the sole attachment margin 2, projecting from the former 4 and mould 6, can be bent inwards or outwards by appropriate means, e.g. rollers.

It is possible to fit to the closure plate 13 of the former 4 a wide variety of inserts such as, for example, felt, wood, sponge plastic and cork inserts including inserts shaped to the foot, as well as reinforcements of metal, fibre-glass and wood; plastic material for giving spring to the instep, complete sole reinforcements, heel-stabilisation elements, preferably in the form of small tubes of light material for accommodating covering strips and to enable the covering strips to be changed for the purpose of repairs, etc. which fitments can be applied, for example, by means of needles, nails, clamps, pins, etc. projecting from the closure plate 13. All these inserts and reinforcement means can of course also be inserted loose.

Furthermore, it is possible to place in the sole mould 10 pre-manufactured elements which, if desired, will be visible in the finished shoe, e.g. outer soles of different colour, intermediate soles, half-soles, heels and heel-cover strips of different colours, and consisting of leather, rubber, plastic, etc. and to bond these to the additional sole attachment material by injection, vulcanisation, or chemical reaction.

The moulds 6 may be designed as porous bodies through which steam can pass. Pressings made of granulated aluminum and synthetic resin binding agents, e.g. epoxy resins, have proved particularly reliable for this purpose. Moulds made, for example, by sintering powdered metal pressings, however, might also be considered. Suitable temperatures in the moulds for shaping the shoe upper and the pressure for filling the bag will depend upon the materials used and can therefore vary over very wide ranges; temperatures of from room temperature to about 200° C. and pressures from about 3 to about 100 atmospheres are possible.

With the method according to the invention, considerable advantages, a pronounced improvement in shoe quality, and, in particular, a large saving in material, especially in the case of dished-sole shoes (Mudgment shoes), can be achieved. The accurately predetermined sole attachment margin usually need only be from 4 to 6 mm. Nevertheless and especially when reinforced by the sole-fastening holes 20, a very good connection of the sole to the upper is achieved. With dished-sole shoes, the savings in the nipping allowance amounts to up to 25 mm. in width along the sole attachment margin on the upper, depending upon the depth of the dished sole. For fitting the uppers in the moulds, no specially qualified operatives are needed, and the shaping process on the upper as well as the operation of soling are carried out at one work point. The insertion of the uppers on the formers is so simple that it can be carried out without diffculty even by automatic manipulators.

A further advantage of the method, according to the invention, resides in the fact that the surface 21 of the closure plate 13 of the former 4 can have depressions and protuberances, so as to form a fully plastic bed in the sole either from the tip to the heel or only in partial zones of the foot, e.g. only at the heel, depending upon the anatomy of the foot. The surface 21 of the closure plate 13 can, of course, also be provided for example with engraved marks for the purpose of simulating leather graining, or for indicating manufacturers' names, trademarks, shoe sizes, etc.

We claim:
1. A method of making footwear comprising the steps of making from a deformable material a shoe-upper blank having a main portion and a marginal circumferential portion; positioning said main portion of said blank within a main mold cavity having an open end with said marginal portion projecting beyond said open end; closing the open end of the main mold cavity and simultaneously rigidly engaging said blank at the inner and outer surface thereof and only along lines at the junction of said main portion and said marginal portion so that said main portion is completely enclosed in said main mold cavity while said marginal portion is located outside of said main mold cavity; deforming said main portion of said blank into conformity with the shape of said main mold cavity by applying fluid under pressure to the inner surface of said blank to thereby obtain an upper of desired configuration; and joining a sole to said projecting marginal portion while said main portion of said blank is located within said main mold cavity and said blank is rigidly engaged along said lines at the junction of said main portion and said projecting marginal portion, said joining being carried out by positioning said marginal portion located outside of said main mold cavity so as to extend into an additional mold cavity, and introducing into such additional mold cavity a solidifiable sole-forming material in contact with said marginal portion so that, when such material is solidified, it constitutes a sole joined to said marginal portion.

References Cited

UNITED STATES PATENTS

| | | | |
|---|---|---|---|
| 665,289 | 1/1901 | Watters. | |
| 823,924 | 6/1906 | Clark | 264—94 |
| 1,863,954 | 6/1932 | Wilhelmi | 264—244 |
| 2,907,074 | 10/1959 | Rhodes | 264—244 X |
| 3,031,723 | 5/1962 | Baudou | 264—244 |
| 3,184,524 | 5/1965 | Whiteford | 264—97 X |
| 3,244,778 | 4/1966 | Ninneman | 264—89 |
| 3,342,914 | 9/1967 | Edwards | 264—89 |

ROBERT F. WHITE, Primary Examiner

A. M. SOKAL, Assistant Examiner

U.S. Cl. X.R.

18—30, 36, 46; 264—250, 278, 314